United States Patent
Brieden et al.

(10) Patent No.: US 9,764,402 B2
(45) Date of Patent: Sep. 19, 2017

(54) CUTTER HEAD AND USE THEREOF

(71) Applicant: Klingelnberg AG, Zürich (CH)

(72) Inventors: Christian Brieden, Hückeswagen (DE); Martin Zagromski, Wetter/Ruhr (DE); Leif Heckes, Hattingen (DE); Jürgen Gsell, Remscheid (DE)

(73) Assignee: KLINGELNBERG AG (CH)

(*) Notice: Subject to any disclaimer, the term of this patent is extended or adjusted under 35 U.S.C. 154(b) by 285 days.

(21) Appl. No.: 14/308,902

(22) Filed: Jun. 19, 2014

(65) Prior Publication Data

US 2014/0377022 A1 Dec. 25, 2014

(30) Foreign Application Priority Data

Jun. 19, 2013 (EP) .................................. 13172666

(51) Int. Cl.
*B23F 23/12* (2006.01)
*B23F 21/00* (2006.01)
*B23F 9/10* (2006.01)
*B23F 21/14* (2006.01)
*B23F 21/22* (2006.01)
*B23C 5/22* (2006.01)

(52) U.S. Cl.
CPC ........ *B23F 23/1212* (2013.01); *B23C 5/2239* (2013.01); *B23C 5/2295* (2013.01); *B23F 9/10* (2013.01); *B23F 21/146* (2013.01); *B23F 21/226* (2013.01); *B23C 2270/025* (2013.01); *Y10T 407/2266* (2015.01)

(58) Field of Classification Search
CPC ............ B23C 2270/025; B23C 5/2295; B23C 5/2239; B23C 5/2458; B23C 5/2482; B23F 23/1212; B23F 9/10; B23F 21/226; B23F 21/146; B23F 21/143; B23B 29/03421; B23B 31/305; B23B 29/03457
USPC .......................................................... 407/11
See application file for complete search history.

(56) References Cited

U.S. PATENT DOCUMENTS

| 960,526 A | * | 6/1910 | Erlandsen ............... B23B 27/10 144/230 |
|---|---|---|---|
| 3,566,506 A | | 3/1971 | Wolf |
| 3,574,251 A | * | 4/1971 | Corti ......................... B23C 5/20 407/45 |
| 4,443,140 A | | 4/1984 | Boetto |
| 4,564,321 A | * | 1/1986 | Kondo .................. B23B 51/048 407/36 |
| 4,658,875 A | | 4/1987 | Grabovac |

(Continued)

FOREIGN PATENT DOCUMENTS

| CN | 102762325 A | 10/2012 |
| DE | 10006777 A1 | 8/2000 |

(Continued)

*Primary Examiner* — Sara Addisu
(74) *Attorney, Agent, or Firm* — McCarter & English, LLP

(57) ABSTRACT

Cutter head for accommodating multiple cutters, wherein the cutter head has a separate receptacle opening for each of the cutters, and wherein the cutter head includes clamping means for clamping the cutters in the receptacle openings. A cavity is implemented in the cutter head in the region of at least one of the receptacle openings, which is separated by a thin wall or layer from this receptacle opening, and the cavity can be filled with a fluid and a pressure can be applied thereto.

15 Claims, 6 Drawing Sheets

(56) References Cited

U.S. PATENT DOCUMENTS

| | | | | |
|---|---|---|---|---|
| 5,358,360 A | * | 10/1994 | Mai | B23Q 11/1084 |
| | | | | 279/20 |
| 5,833,403 A | * | 11/1998 | Barazani | B23B 27/007 |
| | | | | 407/101 |
| 6,270,295 B1 | * | 8/2001 | Hyatt | B23B 29/03457 |
| | | | | 408/1 R |
| 6,609,858 B1 | * | 8/2003 | Francis | B23F 21/226 |
| | | | | 407/113 |
| 6,902,357 B2 | * | 6/2005 | Blessing | B23B 51/0433 |
| | | | | 407/41 |
| 2002/0106251 A1 | * | 8/2002 | Ripley | B23C 5/28 |
| | | | | 407/35 |
| 2004/0191022 A1 | * | 9/2004 | Broghammer | B23B 29/03421 |
| | | | | 409/234 |
| 2007/0127992 A1 | * | 6/2007 | Spichtinger | B23C 5/006 |
| | | | | 407/39 |
| 2012/0321399 A1 | * | 12/2012 | Wuerfels | B23C 5/2295 |
| | | | | 407/69 |
| 2013/0064616 A1 | * | 3/2013 | Nakamura | B23B 29/03421 |
| | | | | 408/1 R |
| 2014/0321927 A1 | * | 10/2014 | Craig | B23B 27/10 |
| | | | | 407/11 |

FOREIGN PATENT DOCUMENTS

| | | | | |
|---|---|---|---|---|
| DE | 102004017714 A1 | * | 6/2005 | B23C 5/04 |
| DE | 102010008187 A1 | | 8/2011 | |

\* cited by examiner

CUTTER HEAD AND USE THEREOF

CROSS-REFERENCE TO RELATED APPLICATIONS

This application claims priority under 35 U.S.C. §1.119 (a)-(d) to European Patent Application No. 13 172 666.3, filed Jun. 19, 2013, the content of which is incorporated herein by reference in its entirety as part of the present disclosure.

FIELD OF THE INVENTION

The present invention relates to cutter heads, in particular bar cutter heads, for gear cutting of workpieces. In particular, it relates to cutter heads or bar cutter heads for gear cutting of bevel gears. The invention also relates to the use of such a cutter head or bar cutter head.

BACKGROUND OF THE INVENTION

There are various types of cutter heads that are used for the cutting machining of metallic workpieces. These cutter heads typically have a main body, which is provided with receptacle openings. The actual tools, which are used during the cutting machining of the workpiece, are inserted into these receptacle openings and clamped using clamping means in the main body.

SUMMARY OF THE INVENTION

Reference is made hereafter in particular to cutter heads that are used for machining bevel gears. However, embodiments the invention can also be used in other cutter heads.

In the case of the cutter heads that are used for producing bevel gears, one differentiates between so-called bar cutter heads and form cutter heads. A bar cutter head is equipped with multiple bar cutters, wherein each bar cutter has a shaft and a head region. Bar cutter heads are more productive than form cutter heads, since more cutters (blades) may be housed on the same circumference, because the bar cutters are reground in the bar longitudinal direction and not in the circumferential direction and therefore require a lesser thickness in the circumferential direction. A form cutter head is equipped with form cutters, in contrast. The form cutters have a different shape than the bar cutters and are only reground on the cutting surface. The known cyclo-palloid method uses such form cutters for producing spiral bevel gears, for example.

Some embodiments of the invention may be applied not only to bar cutter heads, but rather also to form cutter heads. Therefore, the general term cutter head is used as a generic term hereafter.

In the case of these cutter heads, it is important that the cutters that are fastened in the cutter head can be moved into a precisely defined position. The cutters are to remain in this precisely defined position during the cutting machining of a workpiece. Therefore, there are various solutions for fastening the cutters in the receptacle opening of the cutter head by clamping.

In the case of cutter heads, sometimes so-called underlay plates or parallel plates are used to be able to correct the radial position of a bar cutter or form cutter. For this purpose, these plates are offered in different thicknesses. The position of a cutter can thus typically be displaced radially outward. By the use of such plates, the precision of the position of the cutters, the stability of the cutter fastening, and the stiffness of the overall assembly made of cutter head and cutter is impaired.

It has been shown that cutters can have a certain amount of play in the receptacle openings, depending on the cutter head, and can therefore move in a small framework in the event of greater load. Experiments have shown that in some cutter heads, the individual cutters tend to oscillate, which can have a negative influence on the surface quality during the finishing of tooth flanks of a workpiece, for example. Not all cutter head types display this tendency to oscillate of the individual cutters. The tendency to oscillate is apparently dependent not only on geometrical properties, but rather also on material-technology properties of the cutter heads.

Therefore, certain embodiments of the invention is based on the object of providing a solution, which allows the maintenance of precisely predefined cutter positions of the cutters of a cutter head to be achieved.

Above all, it relates to being able to secure the position precision of the cutters of a cutter head also in the event of dynamic loads during the machining of a workpiece.

This exemplary object is achieved according to certain embodiments of the invention by a cutter head having a separate receptacle opening for each of the cutters, and wherein the cutter head comprises clamping means for clamping the cutters in the receptacle openings, such that a cavity is implemented in the cutter head in the region of at least one of the receptacle openings, which is separated by a thin wall or layer from this receptacle opening, and such that the cavity can be filled with a fluid and pressure can be applied thereto. Other advantageous embodiments of the invention are as described herein.

A cutter head according to certain embodiments of the invention is designed to accommodate multiple cutters (form cutters and/or bar cutters). The cutter head has a separate receptacle opening for each of the cutters, and clamping means are provided on the cutter head for clamping the cutters in the receptacle openings. According to the invention, a cavity is implemented in the bar cutter head in the region of at least one of the receptacle openings, which is separated by a thin (partition) wall or (partition) layer from this receptacle opening. This cavity is designed so that it can be filled with a filler, for example, in the form of a fluid, and a pressure can be applied thereto.

A (hydraulic) oil is preferably used as a fluid in certain embodiments.

By applying a pressure, the thin (partition) wall or (partition) layer bulges slightly and presses against a part of the cutter that is located in the adjacent receptacle opening.

In certain embodiments, one separate cavity (i.e., one cavity spatially separated from the other cavities) can be provided per receptacle opening. Each of these separate cavities can individually have pressure applied thereto.

In certain embodiments, one cavity can be provided per receptacle opening, to which pressure can be applied jointly in all cases or in groups.

Certain embodiments are designed so that the pressure can be "switched in" on demand. These embodiments operate quasi-digitally. Either a pressure is applied, or the cavity (cavities) are not pressurized.

Certain embodiments are designed so that the pressure can be "switched in" in steps or continuously on-demand. Thus, for example, during particularly critical machining steps, one can operate at higher pressure than during less critical steps. These embodiments can optionally have means, which allow the oscillation of the cutters to be ascertained. The pressure in the cavity (cavities) can then be adapted or adjusted by a controller or regulator, until the oscillations are no longer measured. The resonance behavior can thus be optimized. In some embodiments, adjustment is performed by the external pre-definition of a hydraulic pressure.

It is an advantage of this solution that pressure can be applied to the cavity if this is necessary. It is thus conceivable, for example, that during certain machining steps (for example, during roughing), one operates without pressure in the cavity, while pressure in the cavity is predefined during the subsequent finishing, to achieve optimum surfaces of the machined flanks of a gearwheel.

It is an advantage of this solution that the pressure can be predefined at different strengths as needed. Therefore, for example, the settings can be changed to manage interfering resonance of the cutter head.

In addition, a solution according to the invention also offers a possibility of compensating for smaller tolerances, which can result in a production-related manner or because of wear or damage.

Certain embodiments of the invention may be used particularly advantageously during the finishing of large-module gear wheels, since the tendency to oscillation of individual cutters is displayed particularly clearly here in the case of conventional cutter heads. An effective remedy can be provided here by the use of the invention.

A use according to the invention of such a cutter head provides that this cutter head is used to manufacture bevel gears, in particular spiral-toothed bevel gears.

Certain cutter heads according to the invention are furthermore distinguished in that they are embodied as substantially monolithic.

Other advantages of the present invention, and/or of the currently preferred embodiments thereof, will become more readily apparent in view of the following detailed description of the currently preferred embodiments and accompanying drawings

BRIEF DESCRIPTION OF THE DRAWINGS

Exemplary embodiments of the invention will be described in greater detail hereafter with reference to the drawings. In the drawings.

DETAILED DESCRIPTION OF EMBODIMENTS OF THE INVENTION

Terms are used in conjunction with the present description, which are also used in relevant publications and patents. However, it is to be noted that the use of these terms is only to serve for better understanding. The ideas of the invention and the scope of protection of the patent claims are not to be restricted in the interpretation by the specific selection of the terms. The invention may be readily transferred to other term systems and/or technical fields. The terms are to be applied accordingly in other technical fields.

Figure 1:
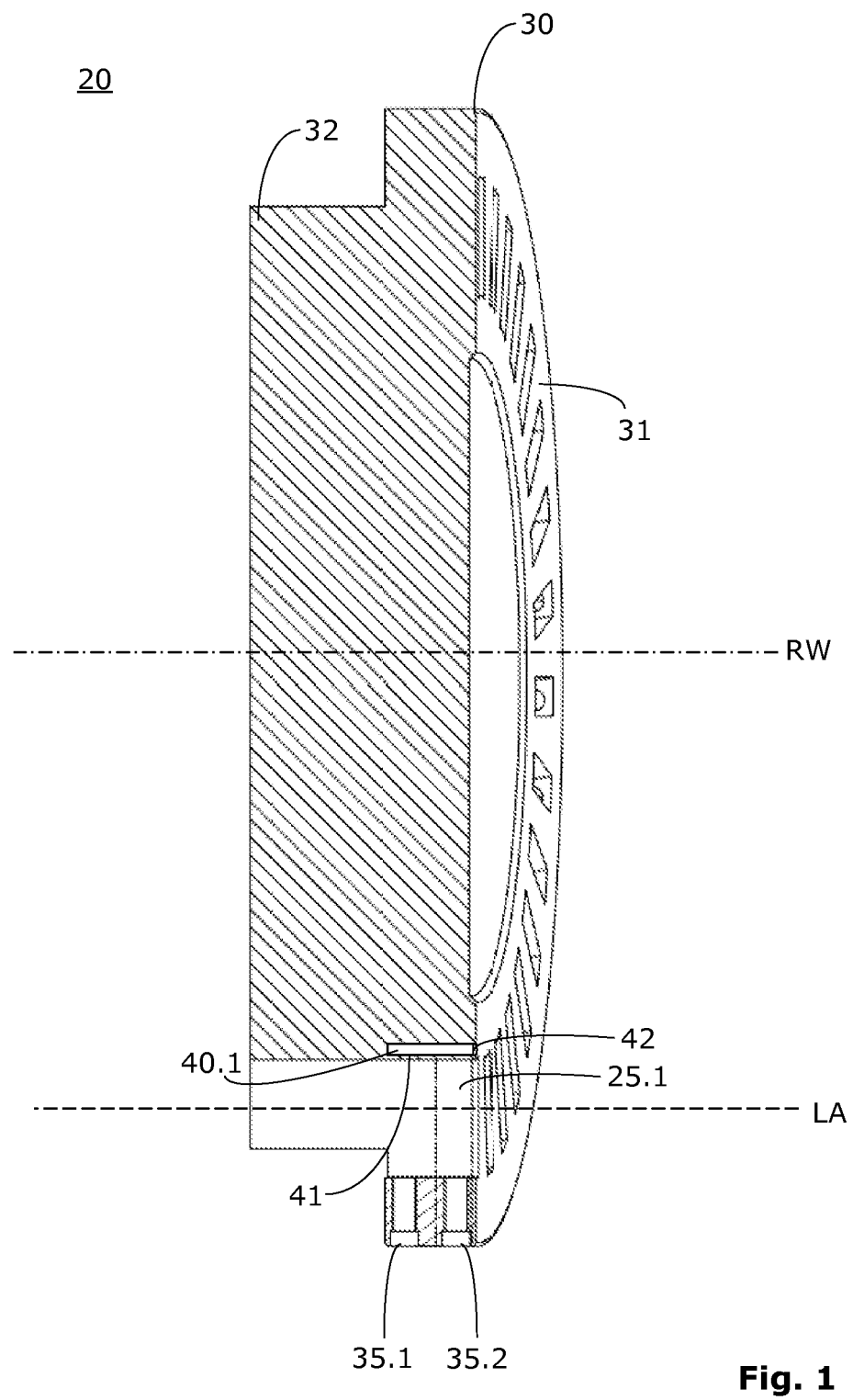
FIG. 1 shows a schematic side sectional view of an exemplary bar cutter head, wherein the cutter head is designed to be equipped on the face with bar cutters.
Figure 6:
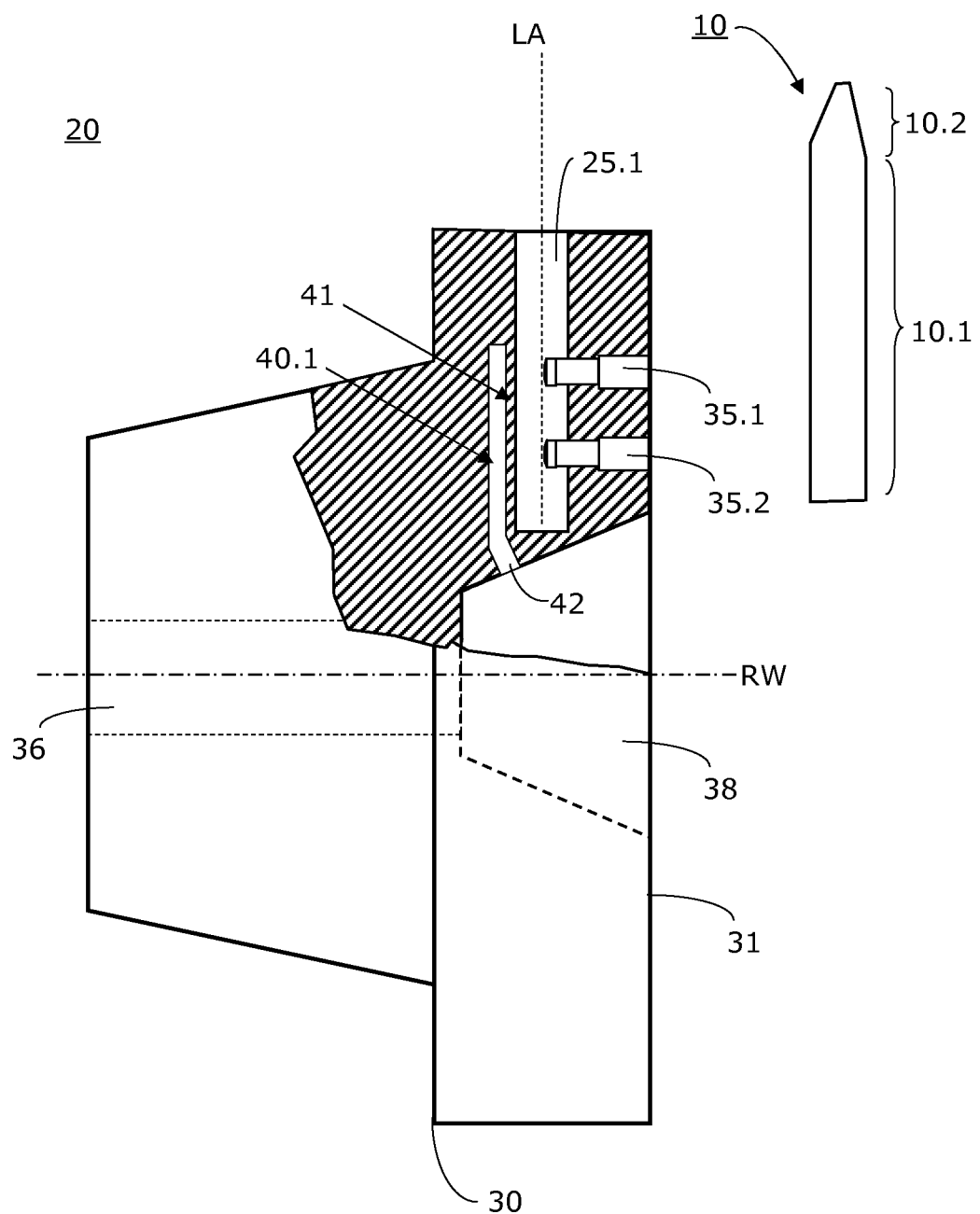
FIG. 6 shows a schematic side view of a further exemplary bar cutter head with a partial sectional view thereof, wherein the cutter head is designed to be equipped with bar cutters along the circumference.

The invention may not only be applied to cutter heads 20, which can be equipped with bar cutters 10, as shown in FIGS. 1 and 6, but rather the invention can also be applied to cutter heads 20 equipped with form cutters. The invention is also applicable to cutter heads, which are equipped with so-called indexable insert holders. In this case, the invention is applied to the indexable insert holder chucked on the cutter head. The following exemplary embodiments, however, relate to bar cutter heads 20 which can be equipped with bar cutters 10, without thus relinquishing the claim to more generalized interpretation.

The invention will be explained hereafter on the basis of a first exemplary embodiment. Corresponding FIG. 1 shows a schematic side view of an exemplary bar cutter head 20 in section, wherein the cutter head 20 is designed to be equipped on the face with bar cutters 10. The bar cutters 10 are not shown here.

The bar cutter head 20 is especially designed to accommodate multiple bar cutters 10 and it has a separate receptacle opening for each of the bar cutters 10. The receptacle openings are identified hereafter and also in the other exemplary embodiments with the reference numerals 25.1 to 25.$n$, wherein n is a whole number greater than 1. The total number of the receptacle openings is established by n.

Not all receptacle openings 25.1-25.$n$ have to be equipped with bar cutters 10. This applies for all embodiments disclosed herein.

The receptacle openings 25.1-25.$n$ represent a recess in the main body 30 of the cutter head 20.

According to certain embodiments of the invention, a cavity 40.1 is implemented in the cutter head 20 in the region of at least one of the receptacle openings 25.1. In FIG. 1, the cavity 40.1 is seated directly adjacent to the receptacle openings 25.1. The cavity 40.1 is separated by a thin wall or layer 41 from the receptacle opening 25.1, and the cavity 40.1 can be filled with a fluid and a pressure can be applied thereto. In the example of FIG. 1, the cavity 40.1 extends parallel to a longitudinal axis LA of the receptacle openings 25.1 and the cavity 40.1 is arranged so that it has an access or filling opening 42, which opens into the end face 31 of the cutter head 20. The opening 42 and the cavity 40.1 are shown in schematic form in FIG. 1.

The cavities 40.1-40.$m$ are preferably applied in all embodiments described herein by drilling and/or milling in the main body 30. The main body 30 can also be cast, however, wherein the receptacle openings 25.1-25.*n* and/or cavities 40.1-40.*m* are preferably already defined during the casting.

For the formation of the receptacle openings 25.1-25.*n*, preferably boreholes are firstly introduced into the main body 30, so that a wire can be led through the main body 30 during the execution of a wire erosion method. A machine cuts out the desired form precisely starting from the boreholes, by guiding the wire along a predefined route.

The bar cutter head 20 has clamping means for clamping the bar cutters 10 in the receptacle openings 25.1-25.*n*. The known solutions can be used here in all embodiments described herein. In FIG. 1, for example, two screw holes 35.1, 35.2 are shown, which extend into the material of the main body 30 essentially parallel to the end face 31 of the main body 30.

Figure 3:
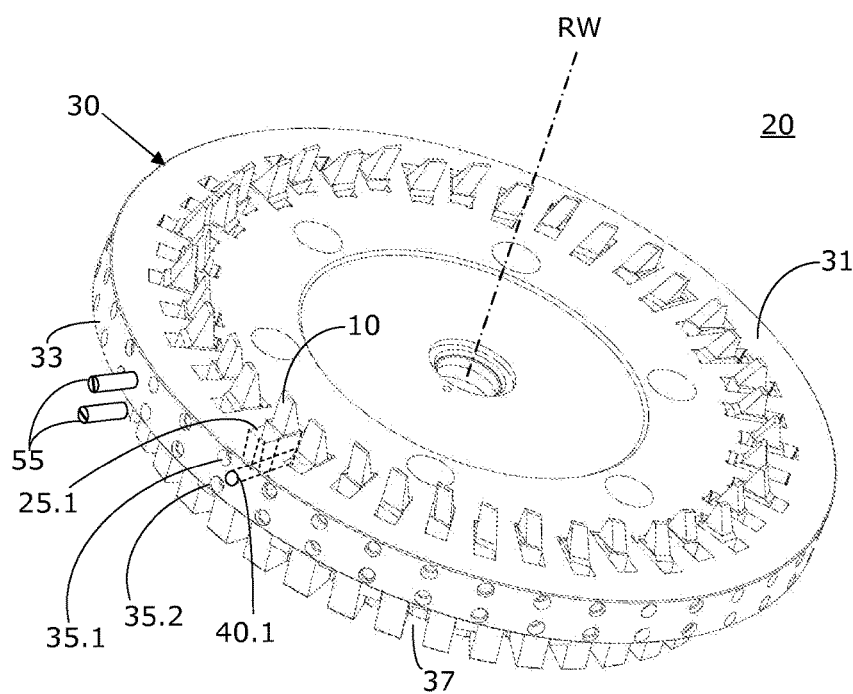
FIG. 3 shows a perspective view of a further exemplary bar cutter head, which is equipped on the face with a bar cutter set having multiple pairs of inner cutters and outer cutters.

Screws 55, e.g. clamping screws, can be used, as shown in FIG. 3, for example. The hydraulic clamping of the invention is independent of the design embodiment of the clamping of the cutters 10 in the main body 30. The (clamping) screws 55 can be provided with washers and/or springs to improve the clamping of the cutters 10. The (clamping) screws 55 can be designed in one part, two parts, or multiple parts, to improve the clamping of the cutters 10. The cutters 10 can be inserted into the receptacle openings 25.1-25.*n* with underlay plates and/or parallel plates and/or wedges, to be able to define or correct the (radial) position of a cutter 10 in relation to the main body 30.

If two (clamping) screws 55 are used per cutter 10, for example (as indicated in FIG. 3), each of these two (clamping) screws 55 can individually press against one clamping side of the cutter 10, to achieve the clamping of the cutter 10.

Alternatively, the (clamping) screws 55 can press using a shared clamping block (not shown) against a clamping side of the cutter 10. In contrast to the embodiment having the two individual (clamping) screws 55, in this case, the force of the (clamping) screws 55 is transmitted via the shared clamping block to the clamping side of the cutter 10.

By screwing screws 55 into the screw holes 35.1, 35.2, the cutter 10 can be fixed in the corresponding receptacle opening 25.1.

The bar cutter head 20 is characterized in that a cavity 40.1 is implemented in the material of the bar cutter head 20 in the region of at least one of the receptacle openings 25.1, as already mentioned in conjunction with FIG. 1. The cavities are identified hereafter and also in the other exemplary embodiments with the reference signs 40.1 to 40.*m*, wherein m is a whole number greater than 1. The total number of the cavities is established by m.

The following relationship applies in all embodiments described herein: m*n. The number m is preferably equal to the number n, i.e., in this preferred case there are precisely as many cavities 40.1 to 40.*n* as receptacle openings 25.1 to 25.*n*.

The cavities 40.1 to 40.*n* are separated by a thin partition wall or partition layer 41 from the respective adjacent receptacle opening 25.1-25.*n*. In addition, the cavities 40.1-40.*m* are designed so that they can be filled with a filler, such as in the form of a fluid, and a pressure can be applied thereto.

FIG. 1 shows a bar cutter head 20, the main body 30 of which comprises a front disc-shaped region and a rear disc-shaped region. The main body 30 is designed as substantially rotationally symmetrical to a tool axis RW. The main body 30 has a so-called end face 31, which is perpendicular to the tool axis RW, on the front disc-shaped region.

The receptacle openings 25.1-25.*n* of the embodiment shown in FIG. 1 are implemented in this end face 31 and they extend into the material of the main body 30, as can be seen in FIG. 1 in the region in section on the basis of a single receptacle opening 25.1. The cavity 40.1 extends parallel to the longitudinal axis LA of the receptacle opening 25.1 here, for example. The tool axis RW and the longitudinal axis LA are parallel in this special case, which is shown simplified.

In a parallel configuration of the cavities 40.1-40.*m* and the receptacle openings 25.1-25.*n*, the cavities 40.1-40.*m* can extend over the entire length of the receptacle openings 25.1-25.*n*, or the cavities 40.1-40.*m* can be shorter, as indicated in FIG. 1. The length is ascertained parallel to the longitudinal axis LA here.

In cutter heads 20 in which the main body is open in the rear region (as in FIG. 1, for example), the shafts of the cutters 10 are at least partially exposed in this region. Therefore, the cavity 40.1 preferably extends only along the region of the receptacle opening 25.1, which is completely enclosed by the material of the main body of the cutter head 20.

The cavities 40.1-40.*m* are each separated by a thin partition wall or partition layer 41 from the respective adjacent receptacle opening 25.1-25.*n*. FIG. 1 shows the partition layer 41 in the sectional view, which has a homogeneous thickness (perpendicular to the longitudinal axis LA) here as a result of the parallel configuration.

Figure 2:
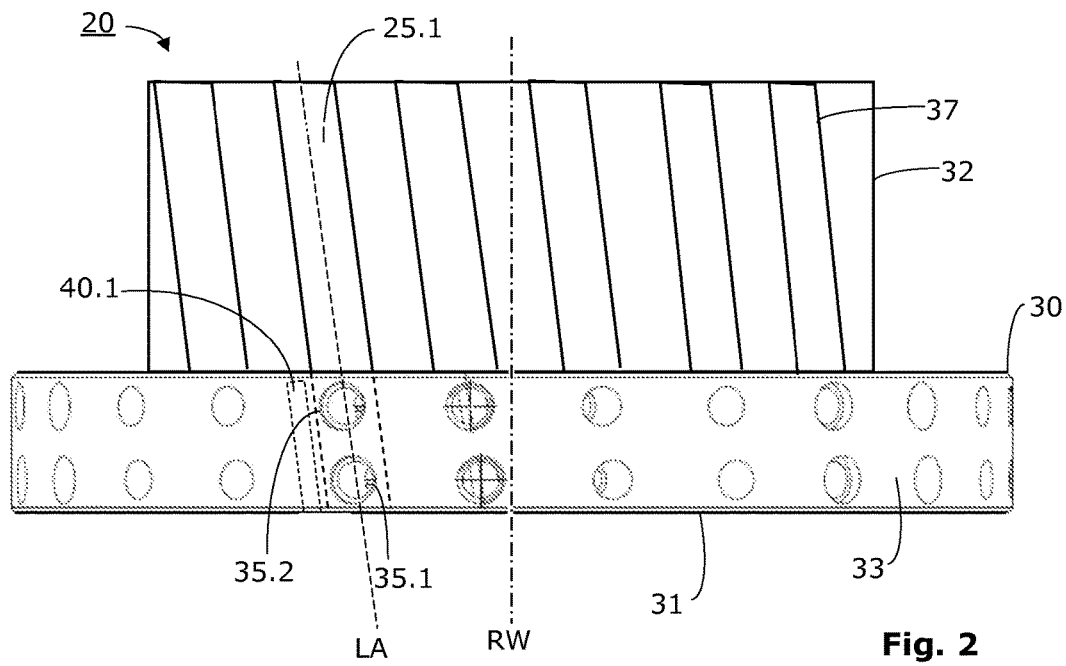
FIG. 2 shows a side view of a further exemplary bar cutter head, wherein the cutter head is designed to be equipped on the face with bar cutters and wherein the bar cutters are slightly inclined.

FIG. 2 shows a side view of a further exemplary bar cutter head 20, wherein the cutter head 20 is designed to be equipped on the face with bar cutters 10 (not shown) and wherein the bar cutters 10 are slightly inclined in relation to the tool axis RW (i.e., LA is inclined in relation to RW). In FIG. 2, the profile of a receptacle opening 25.1 is shown by a dashed line, since this receptacle opening 25.1 extends into the interior of the front disc-shaped region of the main body 30. In the rear disc-shaped section 32, the receptacle openings 25.1 are visible and the shafts of the cutters 10 (if the cutter head 20 is equipped with cutters 10) are partially exposed. Two screw holes are provided on the circumferential side (on the lateral surface) of the front disc-shaped region of the main body 30 per receptacle opening 25.1-25.*n*. The two screw holes of the receptacle opening 25.1 are identified with the reference signs 35.1, 35.2. The screw holes are respectively inclined in pairs, since the receptacle openings 25.1-25.*n* are also inclined here.

The cavity 40.1 also extends parallel to the longitudinal axis LA of the receptacle opening 25.1 in the exemplary embodiment shown in FIG. 2. The cavity 40.1 extends in this case over the entire length of the receptacle opening 25.1 in the front disc-shaped region of the main body 30. The cavity 40.1 does not extend here into the rear disc-shaped section 32.

FIG. 3 shows a perspective view of a further exemplary bar cutter head 20, which is equipped with a bar cutter set having multiple pairs of inner cutters and outer cutters. The bar cutter head 20 also has a disc-shaped main body 30 here, on the end face 31 of which receptacle openings 25.1-25.*n* (also called cutter shafts) are provided for the insertion and fastening of the bar cutters 10. In the example shown, the main body 30 has a total of forty receptacle openings 25.1-25.40 (with n=40). The forty receptacle openings 25.1-25.40 are equipped with twenty inner cutters and twenty outer cutters.

The bar cutters 10 of the exemplary embodiment of FIG. 3 are perpendicular to the end face 31. One pair of screw holes is also provided here per receptacle opening 25.1-

25.40. Only the two screw holes 35.1, 35.2 of the receptacle opening 25.1 are identified with reference signs in FIG. 3.

Two (clamping) screws 55 are shown on the left adjacent to the cutter head 20. These screws 55 can be inserted into the screw holes 35.1, 35.2 and tightened, for example, to fix the bar cutter 10 in the receptacle opening 25.1.

The rear side (of the rear disc-shaped front region) of the main body 30 is also designed as open here and the rear ends of the bar cutters 10 are exposed. All embodiments of the invention described herein can be designed as open or closed on the rear side.

In FIG. 3, the cavity 40.1 shown as an example extends transversely to the receptacle opening 25.1, as schematically indicated by dashed lines. The cavity 40.1 opens here into the circumferential surface 33 of the main body 30. This cavity 40.1 extends at least some distance into the interior of the main body 30 tangentially to a wall of the receptacle opening 25.1. A partition wall or partition layer 41, which is not recognizable in FIG. 3, however, is located between a section of the cavity 40.1 and a section of the receptacle opening 25.1.

Figure 4:
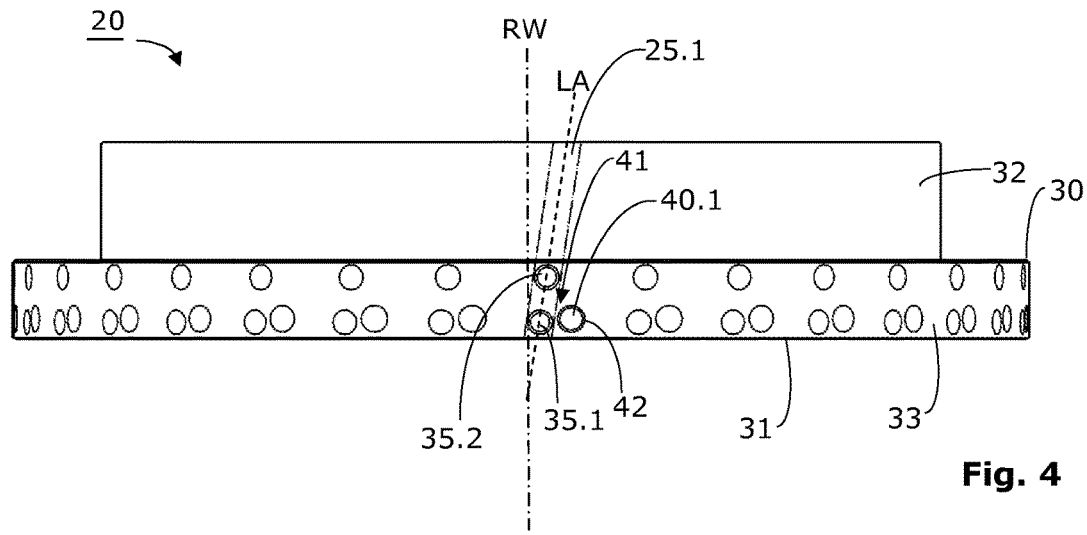
FIG. 4 shows a schematic side view of a further exemplary bar cutter head, wherein the cutter head is designed to be equipped on the face with bar cutters and wherein the bar cutters are perpendicular to the end face.

FIG. 4 shows a schematic side view of a further exemplary bar cutter head 20, wherein the cutter head 20 is again designed to be equipped on the face with bar cutters 10 (not shown) and wherein the bar cutters 10 are inclined to the end face 31 of the main body 30. With regard to the details of this embodiment, reference is made to the previous description. As in the embodiment according to FIG. 3, the axis or filling openings 42 of the cavities 40.1-40.*m* are on the lateral surface 33. One cavity 40.1-40.*n* is provided per receptacle opening 25.1-25.*n* and one access or filling opening 42 is provided per cavity 40.1-40.*n* here.

The cavity 40.1 also extends transversely to the receptacle opening 25.1 in this embodiment, wherein only the orifice opening into the lateral surface 33 of the main body 30 is recognizable of the cavity 40.1. This cavity 40.1 extends at least some distance into the interior of the main body 30 tangentially to a wall of the receptacle opening 25.1. A partition wall or partition layer 41 is located between a section of the cavity 40.1 and a section of the receptacle opening 25.1, but the location thereof is only recognizable as an indication in FIG. 4.

Figure 5:
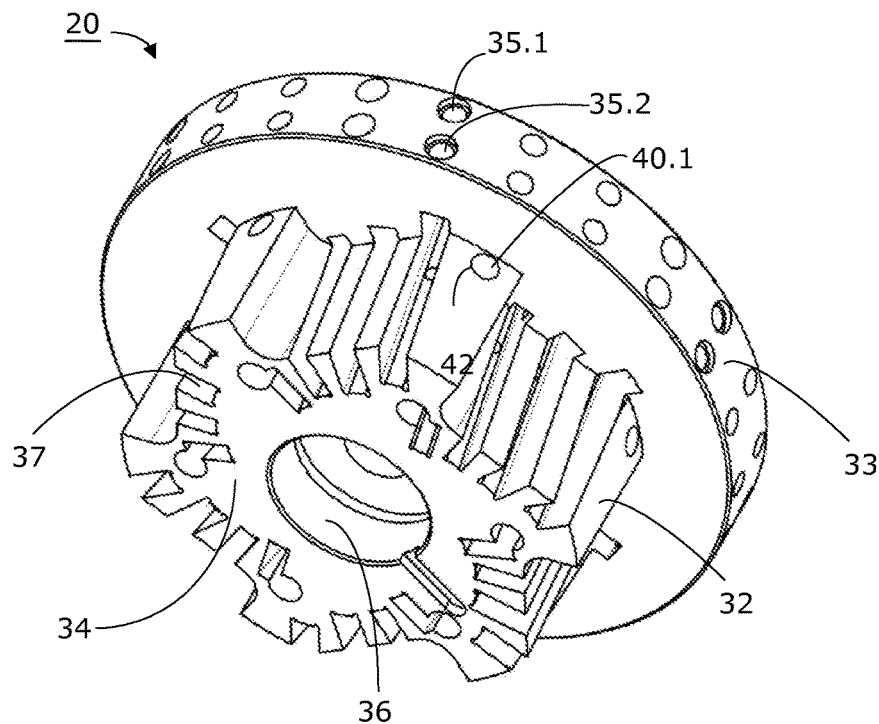
FIG. 5 shows a perspective view of a further exemplary bar cutter head diagonally from below, wherein the visible rear side of the bar cutter head is designed as open and wherein the bar cutters are slightly inclined.

FIG. 5 shows a perspective view of a further exemplary bar cutter head 20 from the rear, wherein the visible rear side of the bar cutter head 20 is designed as open and wherein the bar cutters 10 (not shown) are slightly inclined. Reference is made to the previous description with regard to the details of this embodiment.

In the embodiment according to FIG. 5, the access to the cavity or cavities 40.1-40.*m* is in the rear region 32 of the main body 30. These cavities 40.1-40.*m* extend at least some distance in the interior of the main body 30 (preferably in the front disc-shaped region) tangentially to the wall or walls of one or more receptacle openings 25.1-25.*n*. A partition wall or partition layer, which is not recognizable in FIG. 5, however, lies between a section of the cavity 40.1 and a section of the receptacle opening 25.1.

The rear region 32 of the main body 30 has open cutter shafts 37 here as continuations of the receptacle openings 25.1-25.*n*. The penetration openings of the cutter shafts 37 and also a central borehole 36 can be recognized on the rear end face 34 of the main body 30.

All embodiments described herein can have such a central borehole 36, which permits the cutter head 20 to be connected in a known manner to a workpiece spindle of a machine. However, other fastening means can also be provided in any or all embodiments described herein.

FIG. 6 shows a schematic side view of a further exemplary cutter head 20 in partial section, wherein the cutter head 20 is designed to be equipped with cutters 10 along the circumference. An exemplary cutter 10 is shown in schematic form next to the cutter head 20, to indicate the proportions. The cutter 10 has a shaft 10.1 and a head region 10.2.

The cutters 10 lie pointing radially or diagonally outward here in the main body 30, wherein at least the active region (called head region 10.2) of the cutter 10 protrudes out of the circumferential surface 33 of the cutter head 20. A receptacle opening 25.1 is shown in the region in section in FIG. 6. The screw holes 35.1, 35.2 extend in the example shown from the front side 31 out in the direction of the receptacle openings 25.1-25.*n* lying in the interior of the main body 30. A depression 38, which extends concentrically to the tool axis RW, is provided on the front side, as indicated (this depression preferably has the shape of a truncated cone, which is concentric to the tool axis RW). A central borehole 36 can penetrate the entire main body of the cutter head 20, as indicated in FIG. 6. The cavity 40.1, or its orifice (filling/access opening 42), respectively, can be situated in the region of this depression 38, as shown as an example in FIG. 6. The actual cavity 40.1 extends here in parallel in the opposite direction to the longitudinal axis LA of the receptacle opening 25.1. A partition wall or partition layer 41, which is recognizable in FIG. 6, lies between a section of the cavity 40.1 and a section of the receptacle opening 25.1.

Figure 7A:
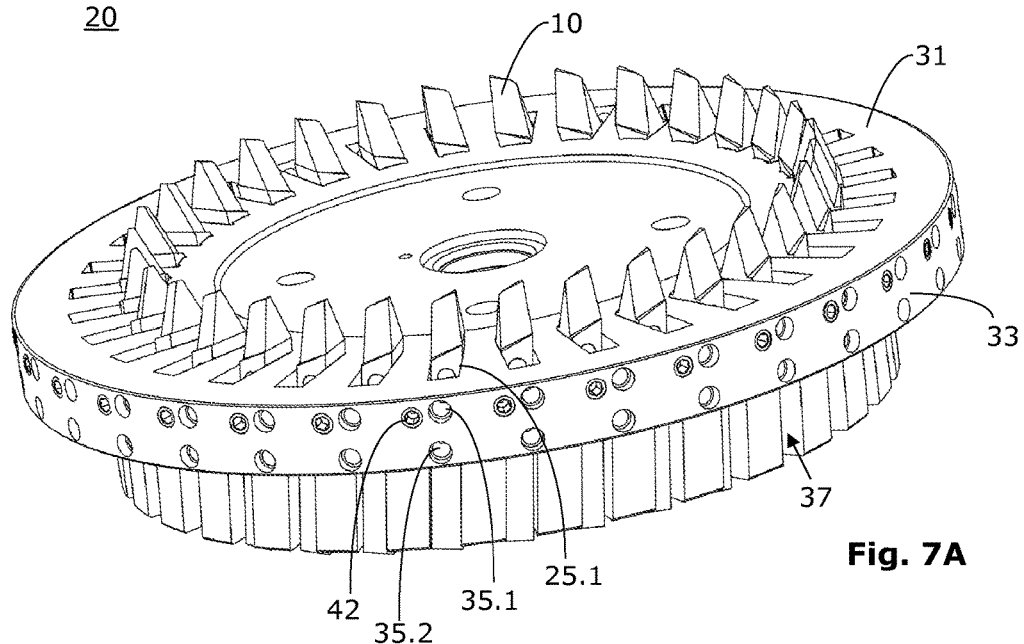
FIG. 7A shows a perspective view of a further exemplary bar cutter head, which is equipped on the face with a bar cutter set having multiple bar cutters.

FIG. 7A shows a perspective view of a further exemplary bar cutter head 20, which is equipped on the face with a bar cutter set having multiple bar cutters 10. Here, n=32 receptacle openings 25.1 to 25.32 are provided and each of these receptacle openings 25.1 to 25.32 is equipped with one bar cutter 10.

The main body of the cutter head 20 again has a front disc-shaped region and a rear open region. Open cutter shafts 37 are visible in the rear open region (similarly as in FIG. 5, for example). Two screw holes are provided here per bar cutter 10. However, only two of the screw holes are provided with the reference signs 35.1, 35.2 in FIG. 7A. The screw holes 35.1, 35.2 are associated with the receptacle opening 25.1, i.e., the bar cutter 10, which is seated in the receptacle opening 25.1, are fastened using the screws 55, which can be screwed in here. The screws 55 are not shown here.

One cavity 40.1 to 40.32 is provided per receptacle opening 25.1 to 25.32 here in the main body of the cutter head 20. These cavities 40.1 to 40.32 are not visible in FIG. 7A. However, it can be recognized that an access or filling opening 42 is seated on the circumferential surface 33 of the main body 30 for each of the cavities 40.1 to 40.32.

Figure 7B:
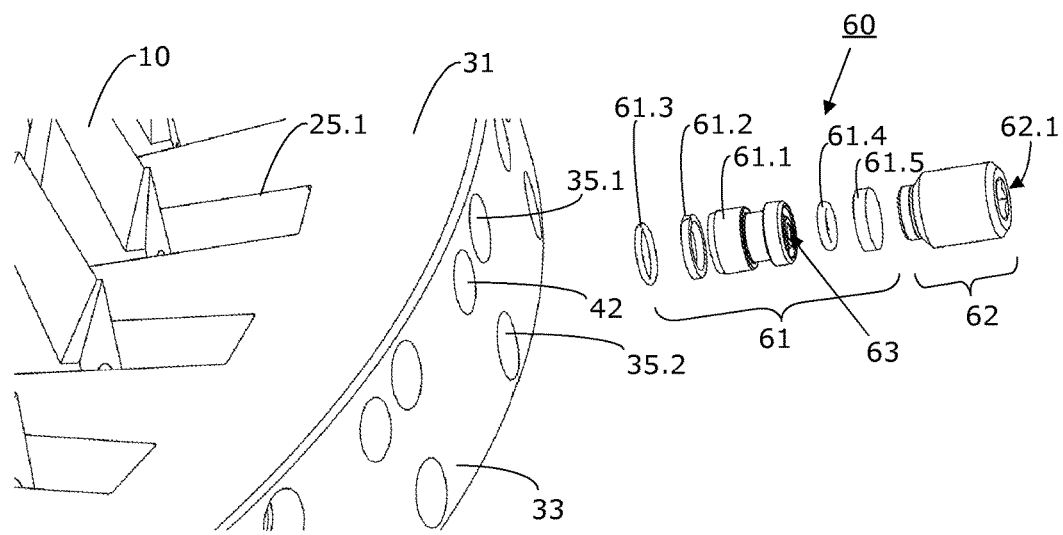
FIG. 7B shows an exploded view of a part of the bar cutter head of FIG. 7A.

FIG. 7B shows an exploded view of a part of the bar cutter head 20 of FIG. 7A. One of the receptacle openings is identified with the reference sign 25.1. Exemplary closure means 60 of the invention are shown on the right adjacent to the cutter head 20. One such closure means 60 is arranged in each of the access or filling openings 42. The closure means 60 are also referred to here as hydro-clamping.

The closure means 60 are can be constructed and/or composed in multiple parts. FIG. 7B shows an exemplary embodiment in which the closure means 60 comprises six parts. Considered from the inside to the outside, the closure means 60 includes a sealing group or sealing unit 61, and a threaded body 62, which is used as a compression body.

As a whole, the closure means 60 may be constructed so that, on the one hand, they allow a pressure to be built up in the interior of the assigned cavity 40.*m* by way of the movement of a sealing group or sealing unit 61. On the other hand, a compression body (preferably in the form of a threaded pin 62) is used, to seal the cavity 40.*m*, together with sealing group or sealing unit 61, to the outside.

The sealing group or sealing unit 61 preferably comprises a plug 61.1, a support ring 61.2, an O-ring 61.3, an O-ring 61.4, and a sealing plate 61.5 in embodiments described herein. The O-rings 61.3, 61.4 are used as radial seals, to prevent an escape of a fluid out of the cavity 40.*m* during movements of the sealing group or sealing unit 61 in the cavity 40.*m* or in the filling/access opening 42.

Figure 7C:
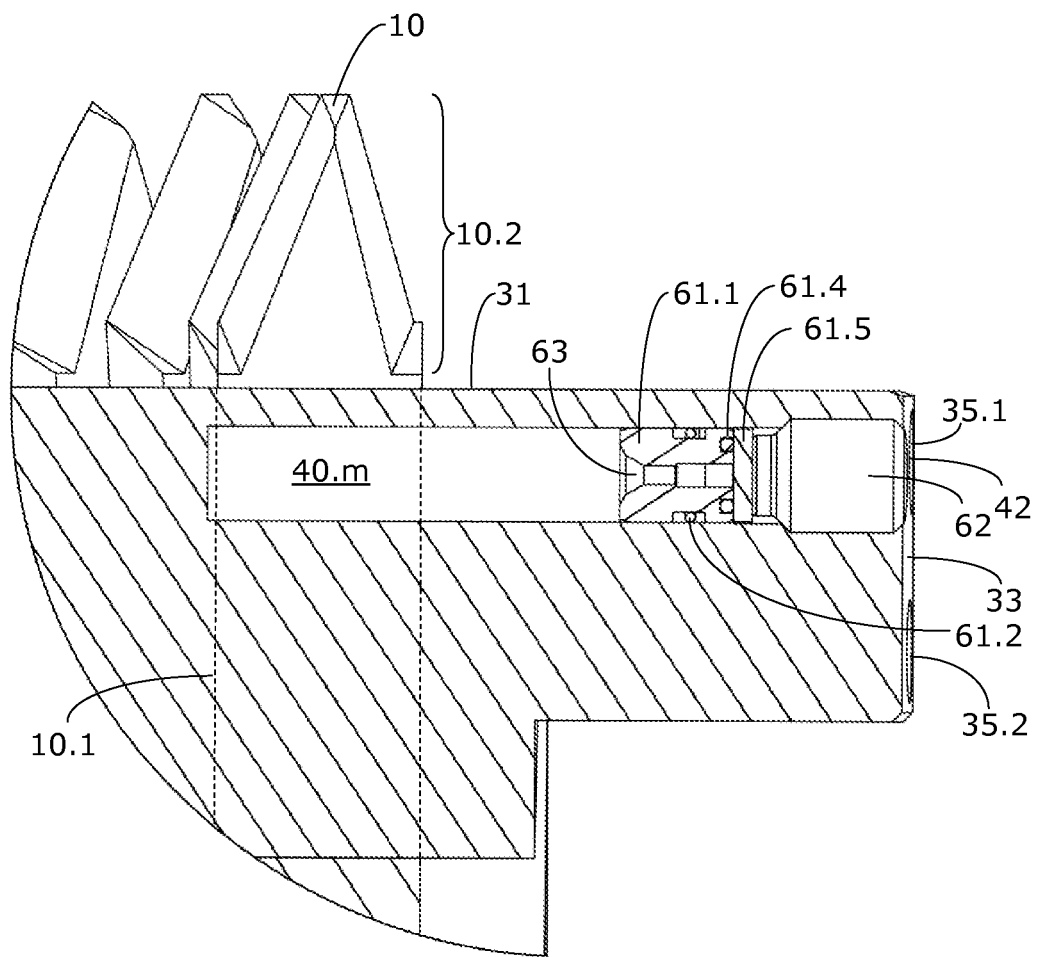
FIG. 7C shows a sectional view through a part of the bar cutter head of FIG. 7A.

FIG. 7C shows a sectional view of a part of the bar cutter head 20 of FIG. 7A. One of the cavities 40.*m* is shown in longitudinal section. The partition wall or partition layer 41, which is seated between a section of the cavity 40.*m* and the associated receptacle opening 21.*n*, is not shown in FIG. 7C. It can be seen in the sectional view that a closure means 60 is seated in the region of the filling/access opening 42 and seals the cavity 40.*m* to the outside. The closure means 60 comprises the elements which are shown in FIG. 7B. To identify the precise position of one of the bar cutters 10, the bar cutter head 10.2 and the shaft 10.1 are shown in FIG. 7C.

The sealing group or sealing unit 61 can include elements, which are used for the axial sealing.

The sealing group or sealing unit 61 can include special elements, or the sealing group or sealing unit 61 is designed so that fluid can be supplied into the cavity 40.*m* or can be removed from the cavity 40.*m* through an opening. It is indicated in FIG. 7B that the plug 61.1 can have a central passage opening 63. If the threaded pin 62 is screwed out in the embodiment shown and the compression plate 61.5 and the O-ring 61.4 are removed from the filling/access opening 42, the cavity 40.*m* can be filled with fluid through the central passage opening 63.

The filling or removal of fluid can also be performed independently of the access opening 42, however, in that, for example, a separate channel, to which pressure can be applied, leads to the cavity 40.*m*.

In certain embodiments, the threaded pin 62 presses in the axial direction via the sealing plate 61.5 on the sealing group or sealing unit 61.

In certain embodiments, the threaded pin 62 is provided with an external thread (not shown in FIG. 7B) and the filling/access opening 42 has a corresponding internal thread.

In certain embodiments, an actuator (not shown) can be used, which allows the pressure to be automatically monitored and influenced. This can be performed, for example, by means of a shared hydraulic line, which is attachable to the cutter head 20.

In certain embodiments, the threaded pin 62 includes a screw head 62.1 (for example, having a hexagon opening), as shown in FIG. 7B. Using a tool (for example, using a hexagon key), the closure means 60 can be individually screwed in deeper to increase the pressure in the cavity 40.*m*, or the closure means 60 can be screwed out somewhat to reduce the pressure.

As may be recognized by those of ordinary skill in the pertinent art based on the teachings herein, numerous changes and modifications may be made to the above-described and other embodiments of the present invention without departing from its scope as defined in the claims. Accordingly, this detailed description of embodiments is to be taken in an illustrative, as opposed to a limiting sense.

What is claimed is:

1. A cutter head configured to accommodate multiple cutters, the cutter head comprising:
at least one receptacle opening configured to receive a cutter;
a clamping means for mechanical clamping of the cutter in the at least one receptacle opening; and
a cavity in the cutter head adjacent to the at least one receptacle opening and separated therefrom by a thin wall or layer, and configured to be filled with a fluid and pressure applied thereto,
wherein the thin wall or layer is deformable by a fluid pressure of a fluid in the cavity so as to provide for a hydraulic clamping applied directly to the cutter and independent of the clamping means.

2. The cutter head according to claim 1, wherein the cavity extends in material of the cutter head either (i) parallel to a longitudinal axis of the at least one receptacle opening, (ii) transversely to the longitudinal axis, or (iii) diagonally to the longitudinal axis.

3. The cutter head according to claim 1, wherein the cutter head comprises a main body having an end face, and the at least one receptacle opening extends from the end face and into the main body.

4. The cutter head according to claim 3, wherein the cavity is accessible from the end face, and extends perpendicularly to or diagonally to the end face into the main body.

5. The cutter head according to claim 3, wherein the main body defines a circumferential surface, and the cavity is accessible from the circumferential surface and extends parallel to the end face or diagonally into the main body.

6. The cutter head according to claim 1, wherein the thin wall or layer is located between a section of the at least one receptacle opening and a section of the cavity.

7. The cutter head according to claim 1, wherein one cavity is provided per receptacle opening.

8. The cutter head according to claim 1, wherein the cavity is associated with multiple of said at least one receptacle opening.

9. The cutter head according to claim 8, wherein the cavity is separated from each of said multiple receptacle openings by a thin wall or layer.

10. The cutter head according to claim 1, further comprising at least one closure means configured to close the cavity.

11. The cutter head according to claim 10, wherein the closure means comprises a threaded pin and at least one sealing group or sealing unit.

12. The cutter head according to claim 11, wherein the at least one sealing group or sealing unit comprises a plug configured to permit supply and/or removal of the fluid through the plug.

13. A method comprising:
using a cutter head that is configured to accommodate multiple cutters and has at least one receptacle opening configured to receive a cutter, a clamping means for mechanical clamping of the cutter in the at least receptacle opening, and a cavity in the cutter head adjacent to the at least one receptacle opening and separated therefrom by a thin wall or layer, wherein the cavity is configured to be filled with a fluid and pressure applied thereto, the thin wall or layer is deformable by a fluid pressure of a fluid in the cavity so as to provide for a hydraulic clamping applied directly to the cutter and independent of the clamping means, the cavity is filled with a fluid; and wherein the using step comprises:
adjusting a pressure of the fluid in the cavity prior to machining a workpiece, so as to deform the thin wall by the fluid pressure of said fluid in the cavity.

14. The method according to claim 13, wherein the step of adjusting the pressure comprises manually adjusting the pressure using a tool.

15. The method according to claim 13, wherein the step of adjusting the pressure is performed by an external pre-definition of a hydraulic pressure.

\* \* \* \* \*